T. JOB.
Machine for Destroying Potato-Bugs.
No. 164,376. Patented June 15, 1875.
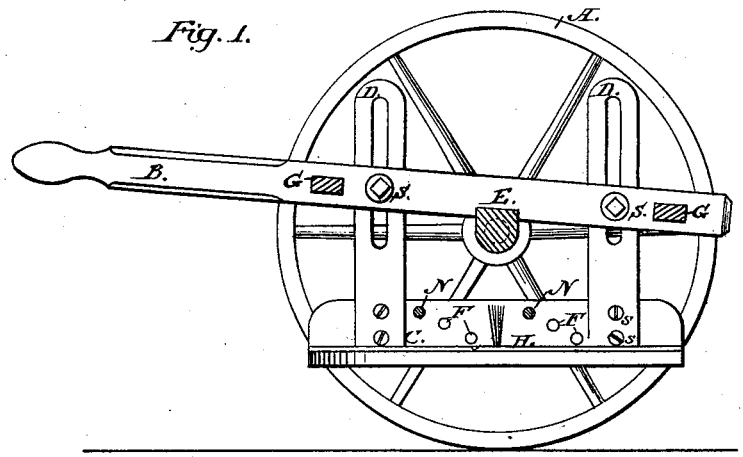
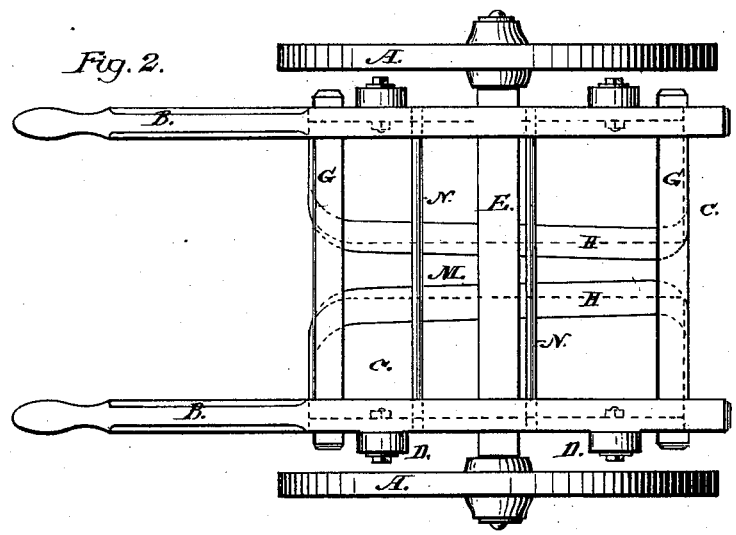
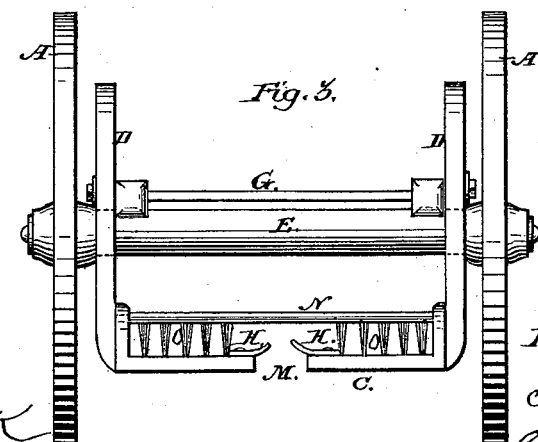

UNITED STATES PATENT OFFICE.

THOMAS JOB, OF RYON TOWNSHIP, SCHUYLKILL COUNTY, PENNSYLVANIA.

IMPROVEMENT IN MACHINES FOR DESTROYING POTATO-BUGS.

Specification forming part of Letters Patent No. 164,376, dated June 15, 1875; application filed January 30, 1875.

*To all whom it may concern:*

Be it known that I, THOMAS JOB, of Ryon township, Schuylkill county, Pennsylvania, have invented a Machine for Destroying Potato-Bugs, of which the following is a specification:

My invention relates to that class of devices intended for use in removing bugs that infest grain and potatoes; and it consists in the combination, with two wheels and an axle, of a vertically-adjustable box or body and two shafts or handles, and propelled by hand, the shafts or handles resting upon the axle, the box or body hanging on the shafts or handles below the axle, having four upright pieces, with a slot cut in each, bolts and nuts holding the box or body in its place, so as to allow the box or body to be raised or lowered to suit the height of the grain or potatoes, with an opening in the bottom of the box or body, running longitudinally the entire length of it, with leather or rubber in front of the opening, cut apart to admit the stalks of grain or potatoes therein to pass through the opening as the vehicle is propelled along, and a cross bar or bars so arranged within the box or body as to strike the tops of the grain or potatoes and remove the bugs therefrom, and throw them into a receptacle in the bottom of the box or body, on each side of the opening, containing tar or other adhesive matter.

In the drawing, Figure 1 represents a longitudinal section of the box or body; Fig. 2, whole top view; Fig. 3, an end view.

A are the wheels. B are the shafts or handles. C is the box or body. E is the axle. D are the upright pieces to which the box or body is fastened to the shafts or handles, with a slot in each piece; and S, the bolts and nuts by which the box or body is kept in its place. F are holes in box or body for the cross bar or bars. G are cross-pieces holding box or body and shafts or handles in their proper position. H shows leather or rubber on each section of the box. M is the opening in the bottom of the box or body C. N is a cross-bar, and O brushes that come in contact with the tops of the grain or potatoes, and removes the bugs which infest the growing plants.

I claim—

The vertically-adjustable receptacle C, in combination with flexible aprons H, brushes O, and rods N, as and for the purpose specified.

THOMAS JOB.

Witnesses:
J. F. ELLICK,
J. H. DRUCKENIELLER.